(12) United States Patent
Fourgeaud et al.

(10) Patent No.: US 9,193,361 B2
(45) Date of Patent: Nov. 24, 2015

(54) SYSTEM FOR DETECTING SERVICE VEHICLES APPROACHING STATIONS

(71) Applicant: Pomagalski, Voreppe (FR)

(72) Inventors: Laura Fourgeaud, Marnaz (FR); Olivier Bertolami, Grenoble (FR)

(73) Assignee: Pomagalski, Voreppe (FR)

( * ) Notice: Subject to any disclaimer, the term of this patent is extended or adjusted under 35 U.S.C. 154(b) by 43 days.

(21) Appl. No.: 13/855,209

(22) Filed: Apr. 2, 2013

(65) Prior Publication Data

US 2013/0289806 A1      Oct. 31, 2013

(30) Foreign Application Priority Data

Apr. 3, 2012  (FR) ..................................... 12 53026

(51) Int. Cl.
  *B61B 12/00*     (2006.01)
  *B61B 12/06*     (2006.01)
(52) U.S. Cl.
  CPC .............. *B61B 12/06* (2013.01); *B61B 12/002* (2013.01); *Y02T 30/30* (2013.01)
(58) Field of Classification Search
  CPC ...... B61B 12/06; B61B 12/002; Y02T 30/30; G01S 1/00; B60Q 9/002; B60Q 9/004–9/006; B60R 9/00–9/058
  USPC .............. 701/1, 36, 49, 50, 300; 104/28, 178, 104/179; 340/436; 105/148; 246/174, 246/218–219, 486
  See application file for complete search history.

(56) References Cited

U.S. PATENT DOCUMENTS

| 5,602,526 A * | 2/1997 | Read .............................. 340/457 |
| 6,177,868 B1 * | 1/2001 | Hollingsworth .............. 340/540 |
| 2004/0000988 A1 * | 1/2004 | Preston ...................... 340/425.5 |
| 2004/0003751 A1 * | 1/2004 | Albrich et al. ................... 104/27 |
| 2009/0256707 A1 * | 10/2009 | Uschold et al. ............ 340/568.1 |

FOREIGN PATENT DOCUMENTS

| AT | 7001 U1 | 7/2004 |
| EP | 2 067 682 A1 | 6/2009 |
| WO | WO 2008/138154 A1 | 11/2008 |

OTHER PUBLICATIONS

French Search Report dated Dec. 11, 2012 for French Application No. 1253026 filed Apr. 3, 2012, 6 pages.

* cited by examiner

*Primary Examiner* — Helal A Algahaim
*Assistant Examiner* — Genna Mott
(74) *Attorney, Agent, or Firm* — Patterson Thuente Pedersen, P.A.

(57) ABSTRACT

A detection system for a vehicle pulled by cable circulating between two stations. The system includes a beacon placed on the vehicle and a receiving antenna placed in each of the stations, and the vehicle includes at least one retractable element on the top of the vehicle and wherein the beacon emits only when the retractable element remains protruding from the vehicle. When the beacon emits, the receiving antenna situated in the station is informed of a risk of collision of an element of the vehicle with the station, thus being able to communicate the information to the control/command system of the cable. When the beacon is not emitting, the receiving antenna is idle and the vehicle can enter into the station.

8 Claims, 3 Drawing Sheets

SYSTEM FOR DETECTING SERVICE VEHICLES APPROACHING STATIONS

RELATED APPLICATION

The present application claims priority to French Application No. 1253026 filed Apr. 3, 2012, which is incorporated herein in its entirety by reference.

TECHNICAL FIELD

The present invention relates to a system for detecting vehicles pulled by cables approaching stations.

BACKGROUND

Cable transport installations, in particular cable cars, require a certain servicing which is performed using service vehicles. These service vehicles often have top platforms and guard rails which protrude from the station access area. In particular when they are being used to service levers, they are higher than the station ceiling. There is therefore a risk of collision with the ceiling of the station resulting in damage to the latter and to the vehicle, not to mention the danger to workers in the vehicle or in the station.

SUMMARY OF THE INVENTION

Embodiments of the invention set out to resolve this problem by a detection system which make it possible to ensure that the vehicle which is entering into the station has the requisite dimensions or by making it possible to stop the vehicle before its entry into the station if such is not the case.

The detection system according to embodiments of the invention applies to a vehicle pulled by cable which circulates between two stations; the system consists of an emitting beacon placed on the vehicle and a receiving antenna placed in each of the stations, and it is characterized in that the vehicle comprises at least one protruding retractable element, for example on top of the vehicle, and that the beacon emits only when the retractable element remains raised. Thus, when the beacon emits, the receiving antenna situated in the station is informed of a risk of collision of an element of the vehicle with the station, thus being able to communicate the information to the control/command system of the cable. When the beacon is not emitting, the receiving antenna is idle and the vehicle can enter into the station. The beacon and the receiving antenna will be able to use RFID (Radio Frequency Identification) technology.

According to a first feature, the receiving antenna cooperates with a control/command system controlling the cable. In this way, the control/command system controlling the cable can take this parameter into account and adapt the circulation of the vehicle on the cable according to the possible danger.

According to a particular feature, the control system controls the stopping of the vehicle before its entry into the station when the retractable element is raised. The control system stops the vehicle before its entry into the station if the beacon is emitting; the receiving antenna has a reception field that is sufficient to allow for the stopping of the vehicle in time, that is to say before its entry into the station.

According to another feature, the vehicle is a service vehicle. This service vehicle can be of any type: mobile footbridges, standard decks, etc.

According to another feature, the retractable element is a piece whose size does not allow entry into the station when it is protruding, such as, for example, a guard rail.

According to another feature, the beacon emits when it is activated by an electrical contact actuated by the movement of the retractable element. It is the position of the retractable element which opens or closes the contact.

The electrical contact which controls the emitting of the beacon is a contact of normally closed type. That is to say that the electrical contact is closed when it is idle and open when it is actuated. Thus, when the retractable element is raised, the contact is closed and the beacon emits.

According to a first variant, the opening and the closure of the electrical contact is controlled by a mechanical switch actuated when the retractable element is lowered. Thus, when the retractable element is raised, the mechanical sensor is idle, the electrical contact is closed and the beacon emits.

According to a second variant, the electrical contact is controlled by a magnetic sensor.

According to a particular feature, a part of the magnetic sensor is situated on a part of the retractable element and the second part of the electrical contact is fixed to the vehicle. In this way, the movement of the retractable element allows for the actuation of the contact, because this first part of the magnetic sensor is located facing the second part when the retractable element is lowered, which electrically actuates the sensor by allowing the flow of current between the two parts and thus opens the electrical contact of the beacon. Thus, when the retractable element is raised, the contact is closed and the beacon emits.

BRIEF DESCRIPTION OF THE DRAWINGS

Embodiments of the invention also relate to a vehicle equipped with the system with the above features.

Other advantages will become more apparent on reading the following detailed description, given as an indication and in no way limiting, and with reference to the appended drawings presented below.

DETAILED DESCRIPTION

Figure 1:
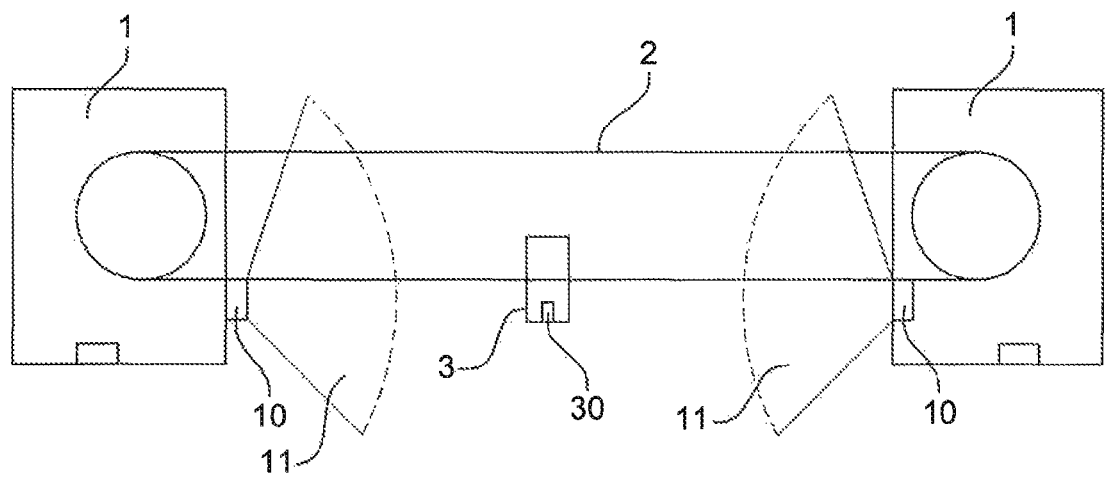
FIG. 1 is a schematic description of a cable car equipped with the system according to an embodiment of the invention.

In the case of a cable car equipped with a system according to an embodiment of the invention, FIG. 1 shows two stations 1 between which a pulling cable 2 is stretched. The cable 2 allows for the circulation of a vehicle 3 equipped with a sensor 30 comprising a beacon 300 capable of cooperating with a receiving antenna 10, or reader, placed in a station 1. Each station 1 is equipped with a receiving antenna 10. The receiving antenna 10 has a detection area 11 beyond which it picks up nothing and which corresponds to the field covered by the antenna 10.

When the vehicle 3 approaches a station 1, if the beacon 300 emits as soon as it enters into the detection area 11 of the receiving antenna 10 of said station 1, the vehicle 3 is stopped. If the beacon 300 does not emit, the vehicle 3 can enter into the station.

Figure 2:
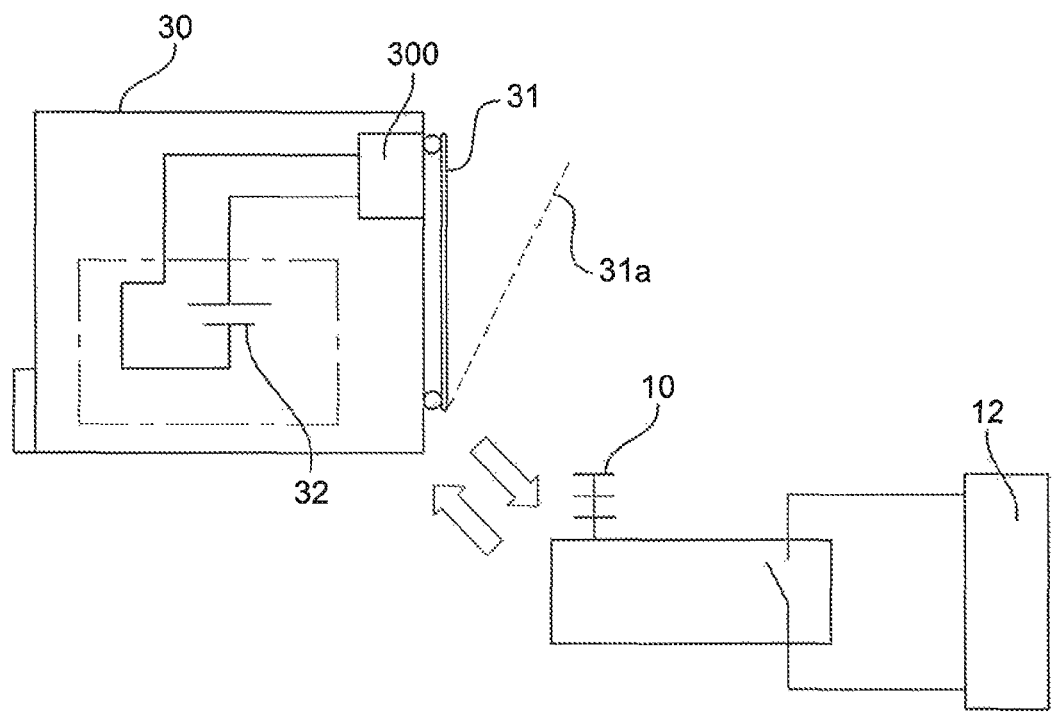
FIG. 2 is a block diagram of the system.

FIG. 2 illustrates the mode of operation of the beacon 300. The beacon 300 is linked in a conventional manner to a battery 32. The beacon 300 emits when it is supplied with current by the battery 32, this power supply being obtained via an electrical contact 31 such as a switch and when said electrical contact 31 is closed. When it is open, that is to say in the position 31a, the beacon 300 does not emit.

When the beacon 300 emits and the vehicle is approaching a station 1, the receiving antenna 10 receives the signal when the beacon 300 enters into the detection area 11 of the receiving antenna 10, which informs a logic controller or control system 12, which stops the cable 2 and the vehicle 3 before its entry into the station.

Figures 3, 4:
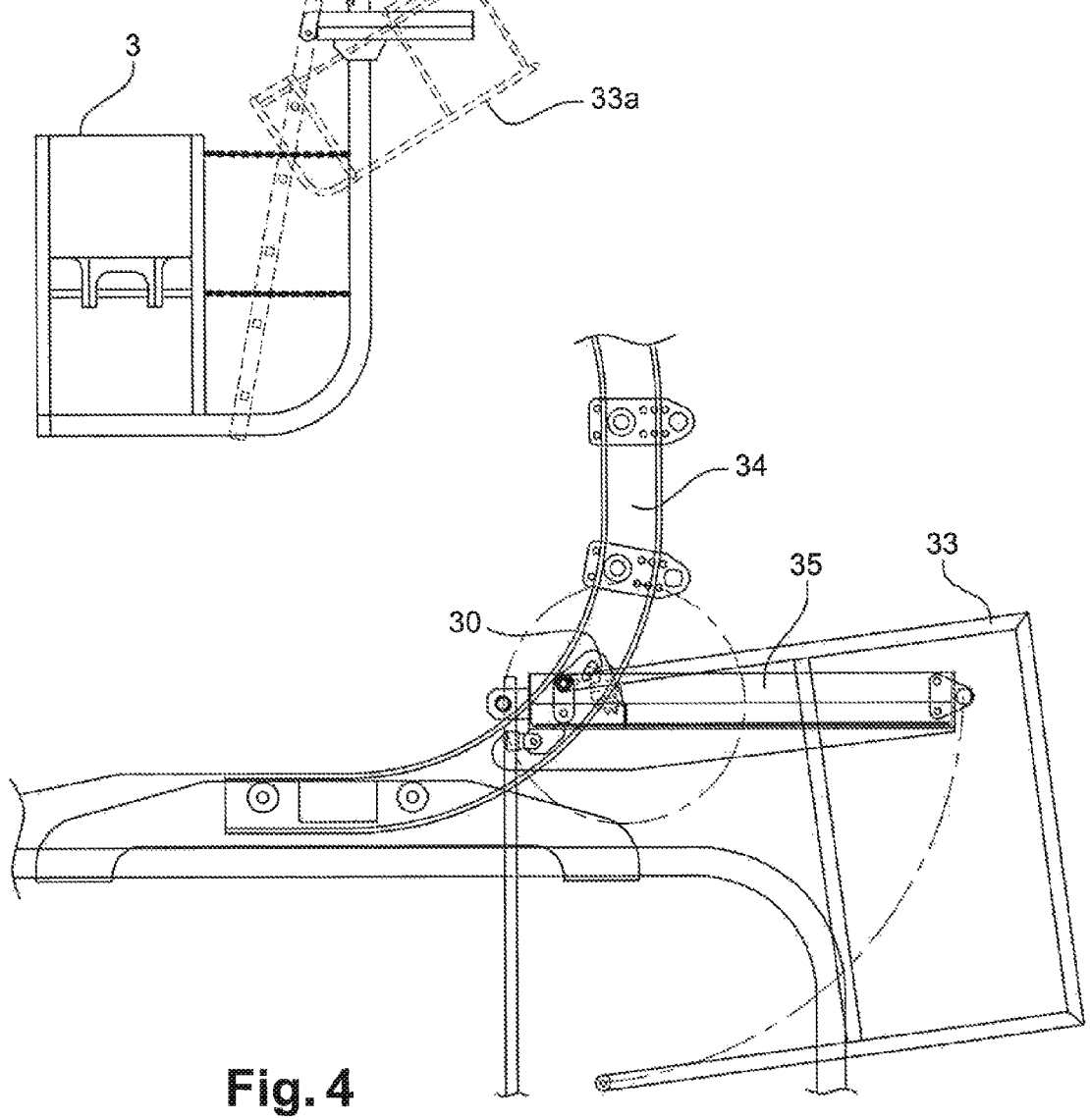
FIG. 3 is a perspective view of a service vehicle equipped with the system with phantom lines depicting the retractable element in the retracted position.
FIG. 4 is a fragmentary, enlarged view of the articulation of the guard rail of the vehicle of FIG. 3.

The vehicle 3 illustrated in FIG. 3 comprises a retractable element 33, such as, for example, a guard rail. When said retractable element 33 is retracted (position 33a), the beacon 300 does not emit. When said retractable element 33 is extended or raised (position 33), the beacon 300 emits.

In the example illustrated in FIG. 3, the retractable element 33 is arranged on a hanger 34 which supports the vehicle 3 on the cable 2.

FIG. 4 shows an example of positioning of the beacon 300; in the example illustrated the sensor 30 is situated between the retractable element 33 (the guard rail) and a grating 35.

Figure 5:
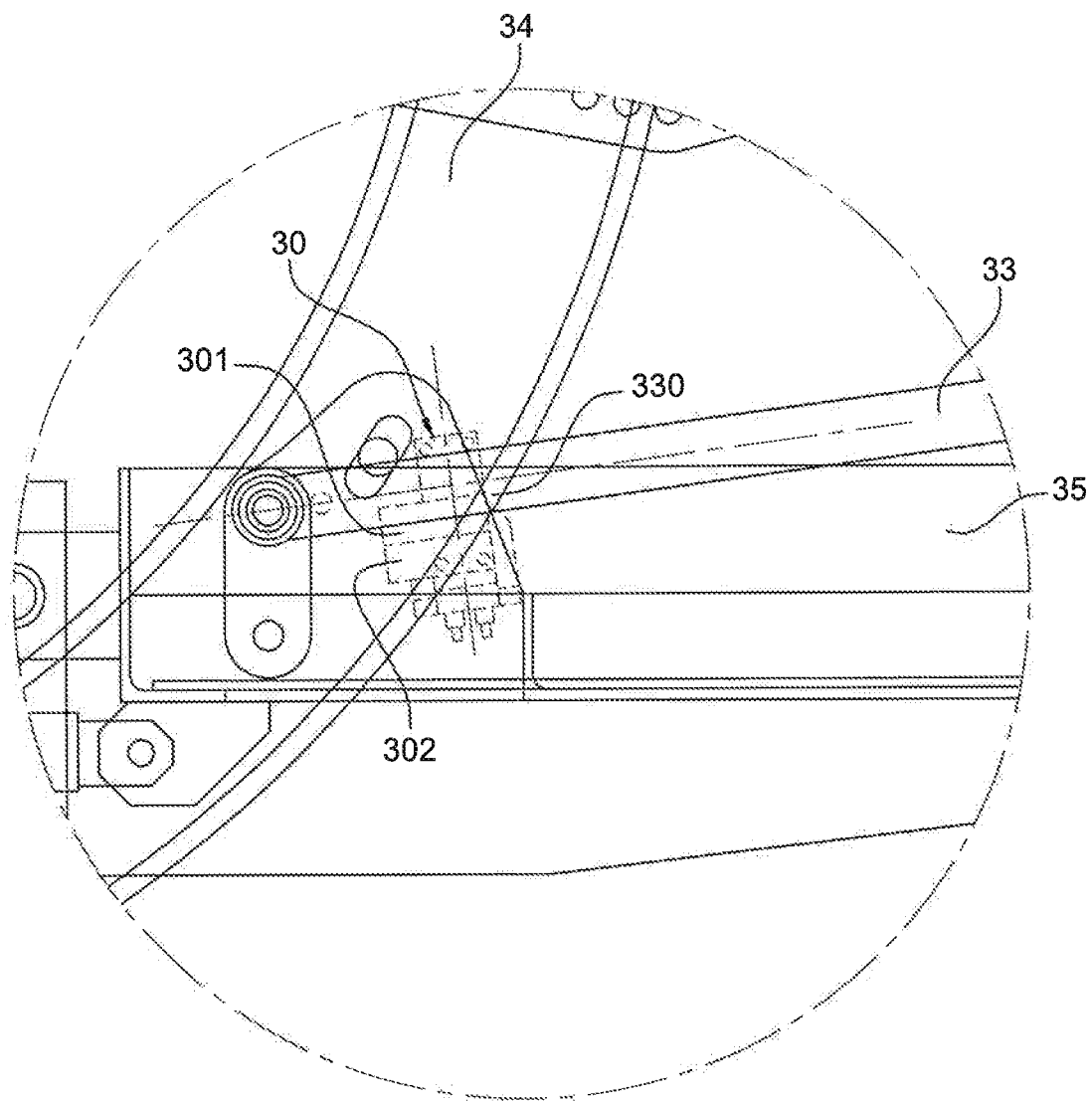
FIG. 5 is an enlarged view of portion A of FIG. 4.

The detail of the beacon 300 is illustrated in FIG. 5. It can be seen that the sensor 30 also consists of a magnet 301 and of a magnetic contact 302 linked to the beacon 300. The magnet 301 is fixed to a part 330 of the retractable element 33 whereas the magnetic contact 302 is attached to the grating 35.

When the guard rail or the retractable element 33 is folded back or retracted, the magnet 301 is facing the magnetic contact 302. In this example, the electrical contact is normally closed, that is to say that the current is cut when the contact is closed.

The invention claimed is:

1. A detection system for detecting a vehicle operably coupled to and pulled by a cable extending between at least two stations, said cable coupled to and shiftable by a control/command system for selective transportation of said vehicle between said at least two stations, the detection system comprising:
   a beacon carried by the vehicle, said beacon configured for selectively emitting a beacon signal;
   a receiving antenna placed at each of a respective one of said at least two stations, each of said receiving antennas configured for receiving the beacon signal emitted by said beacon when said vehicle is within a predetermined proximal distance of each respective one of said stations; and
   a retractable element operatively coupled to said vehicle, said retractable element shiftable between an extended first position protruding from the vehicle and a retracted second position,
   said beacon emitting said beacon signal only when the retractable element is in said extended first position;
   wherein said control/command system is constructed to halt said selective transportation of said vehicle in response to reception of said beacon signal within said predetermined proximal distance of any one of said stations, wherein said predetermined proximal distance is sufficiently large to enable said selective transportation of said vehicle to be halted prior to entry of said vehicle into one of said stations upon the receiving antenna placed at the one of said stations receiving said beacon signal.

2. The detection system according to claim 1, wherein the receiving antenna cooperates with the control/command system controlling the cable.

3. The detection system according to claim 1, wherein said predetermined proximal distance is limited such that said vehicle is permitted to travel a majority of a distance between adjacent ones of said stations when said beacon signal is being emitted.

4. The detection system according to claim 1, wherein the vehicle is a service vehicle.

5. The detection system according to claim 1, wherein the retractable element is a piece whose size does not allow entry into the station when it is protruding.

6. The detection system according to claim 1, wherein the beacon emits when it is activated by an electrical contact actuated by the movement of the retractable element.

7. The detection system according to claim 6, wherein the electrical contact is a normally closed contact.

8. The detection system according to claim 6, the electrical contact including an actuator having a first part and a second part, and wherein the first part of the actuator of the electrical contact is situated on a part of the retractable element and the second part of the actuator of the electrical contact is fixed to the vehicle.

\* \* \* \* \*